(12) United States Patent
Sheridan

(10) Patent No.: US 7,246,050 B2
(45) Date of Patent: Jul. 17, 2007

(54) VEHICLE OPERATIONS SIMULATOR WITH AUGMENTED REALITY

(75) Inventor: Thomas B. Sheridan, West Newton, MA (US)

(73) Assignee: David R. Sheridan, Wellesley, MA (US)

( * ) Notice: Subject to any disclaimer, the term of this patent is extended or adjusted under 35 U.S.C. 154(b) by 0 days.

(21) Appl. No.: 11/454,601

(22) Filed: Jun. 16, 2006

(65) Prior Publication Data

US 2007/0136041 A1 Jun. 14, 2007

Related U.S. Application Data

(63) Continuation of application No. 10/001,362, filed on Oct. 23, 2001, now abandoned.

(60) Provisional application No. 60/242,614, filed on Oct. 23, 2000.

(51) Int. Cl.
*G06G 7/48* (2006.01)

(52) U.S. Cl. ............ 703/8; 703/6; 703/7; 434/29; 434/44; 434/61; 701/1; 701/24

(58) Field of Classification Search ............ 703/6, 703/7, 8; 434/29, 44, 61; 701/1, 24
See application file for complete search history.

(56) References Cited

U.S. PATENT DOCUMENTS

| | | | | |
|---|---|---|---|---|
| 5,320,534 A | * | 6/1994 | Thomas | 434/44 |
| 5,547,382 A | * | 8/1996 | Yamasaki et al. | 434/61 |
| 6,064,749 A | * | 5/2000 | Hirota et al. | 382/103 |
| 6,094,625 A | * | 7/2000 | Ralston | 702/150 |
| 6,195,625 B1 | * | 2/2001 | Day et al. | 703/7 |
| 6,903,752 B2 | * | 6/2005 | Ebersole et al. | 345/632 |
| 2002/0196202 A1 | * | 12/2002 | Bastian et al. | 345/8 |
| 2003/0210228 A1 | * | 11/2003 | Ebersole et al. | 345/157 |

OTHER PUBLICATIONS

"Helmet-Mounted Display Technology on the VISTA NF-16D", Bailey et al, Proceedings of SPIE, vol. 3058, pp. 311-322, 1997.*
"Integrating Virtual and Augmented Realities in an Outdoor Application", Piekarski et al, 2nd International Workshop on Augmented Reality IEEE 1999.*

(Continued)

*Primary Examiner*—Fred Ferris
(74) *Attorney, Agent, or Firm*—Elizabeth Chien-Hale

(57) ABSTRACT

This invention provides in a safe and effective manner the experience of observing potential collision obstacles or other hazard images to the human operator of an otherwise conventional vehicle, (such as an automobile or aircraft) moving in a normal manner in a natural environment (such as an outdoor test track). The invention incorporates in addition to the mobile vehicle, computer-based image generation devices, and position, velocity, acceleration, measurement instruments to enable the simulated visual hazard images, including operator perception of and response to those hazard images. Making the actual moving vehicle part of the simulated hazard encounter means the vestibular (motion) cues and visual cues of the natural environment are very realistic, while only the computer-generated hazard images imposed on the natural environment view are virtual. The system results in a safe and cost efficient way of producing a realistic experience of vehicle operation encounters, including both the observation and response.

20 Claims, 7 Drawing Sheets

Interacting elements of the invention

OTHER PUBLICATIONS

"Spatially Augmented Reality", Raskar et al, 1st International Workshop on Augmented Reality Nov. 1998.*

"Development of a Night Diving Simulator Concept for Night Vision Image Intensification device training", Ruffner et al, SPIE 11th, vol. 3088, pp. 190-197, 1997.*

Development and Applications of JUT-ADSL Driving Simulator, ACM 0-7803-5296-3/99, Mar. 1999.*

"Driving Simulation for Crash Avoidance Warning Evaluation", Tinker et al, Proceedings of ISATA 29th, pp. 367-374, 1996.*

"Registration for Outdoor Augmented Reality Applications Using Computer Vision Techniques and Hybrid Sensors", Behringer, DAAL01-96-2-0003, 1996.*

"International Survey: Virtual-Environment Research", Boman, IEEE 0018-9162/95, 1995 IEEE.*

"The Iowa Driving Simulator: An Immersive Research Environment", Kuhl et al, IEEE 0018-9162/95, IEEE 1995.*

"Interaction, Immagination and Immersion Some Research Needs", T. Sheridan, VRST 2000, ACM 2000.*

* cited by examiner

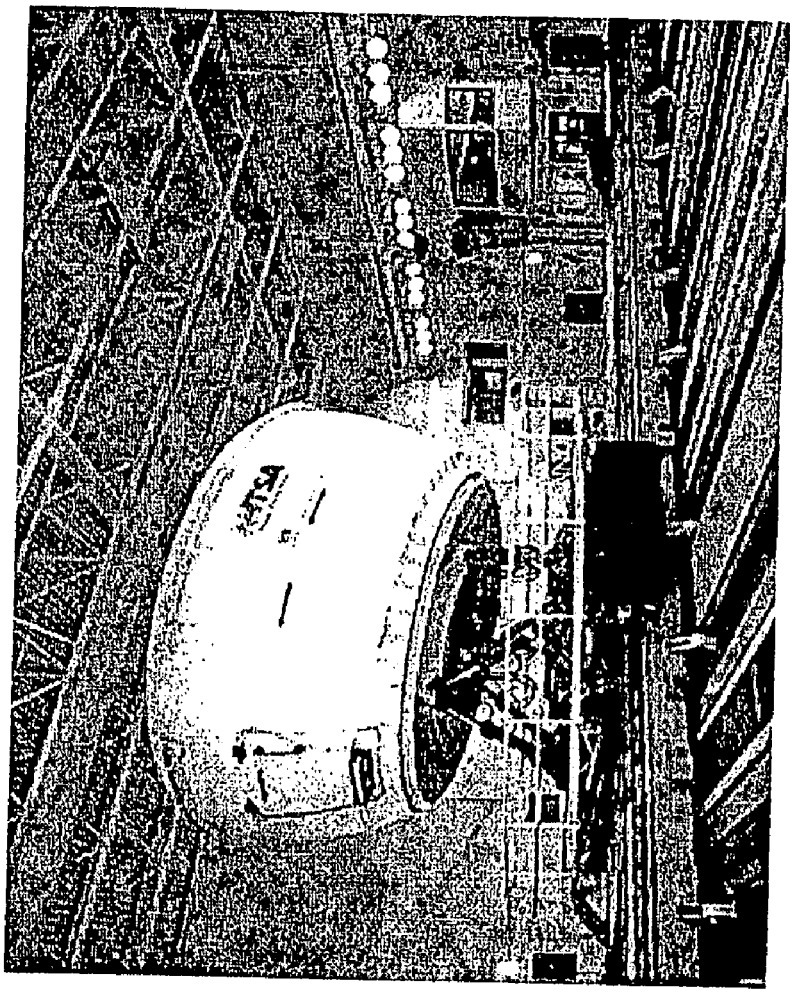
Figure 1. National Advanced Driving Simulator

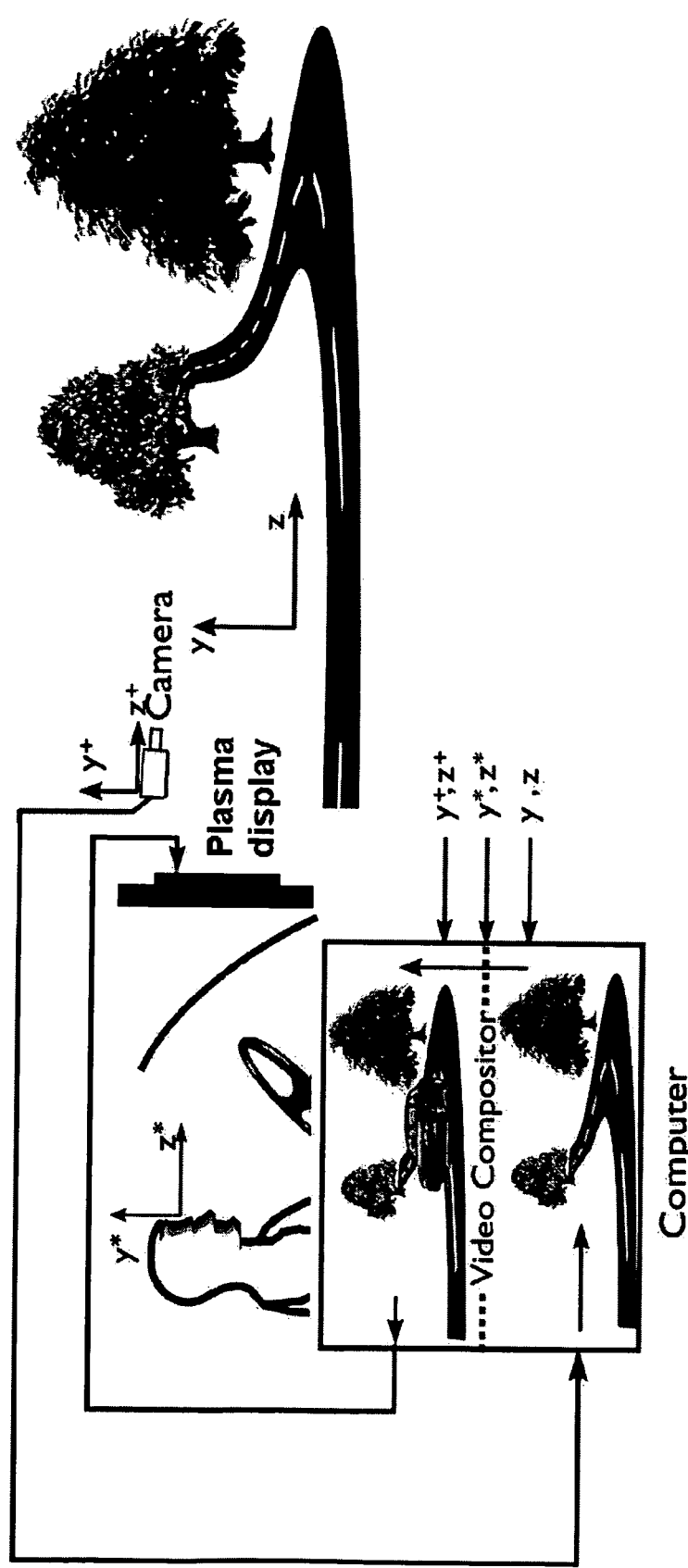
Figure 2. Operator driving vehicle in natural environment with optical sensor feeding image generator, and virtual computer-graphic hazard object being superposed on flat display

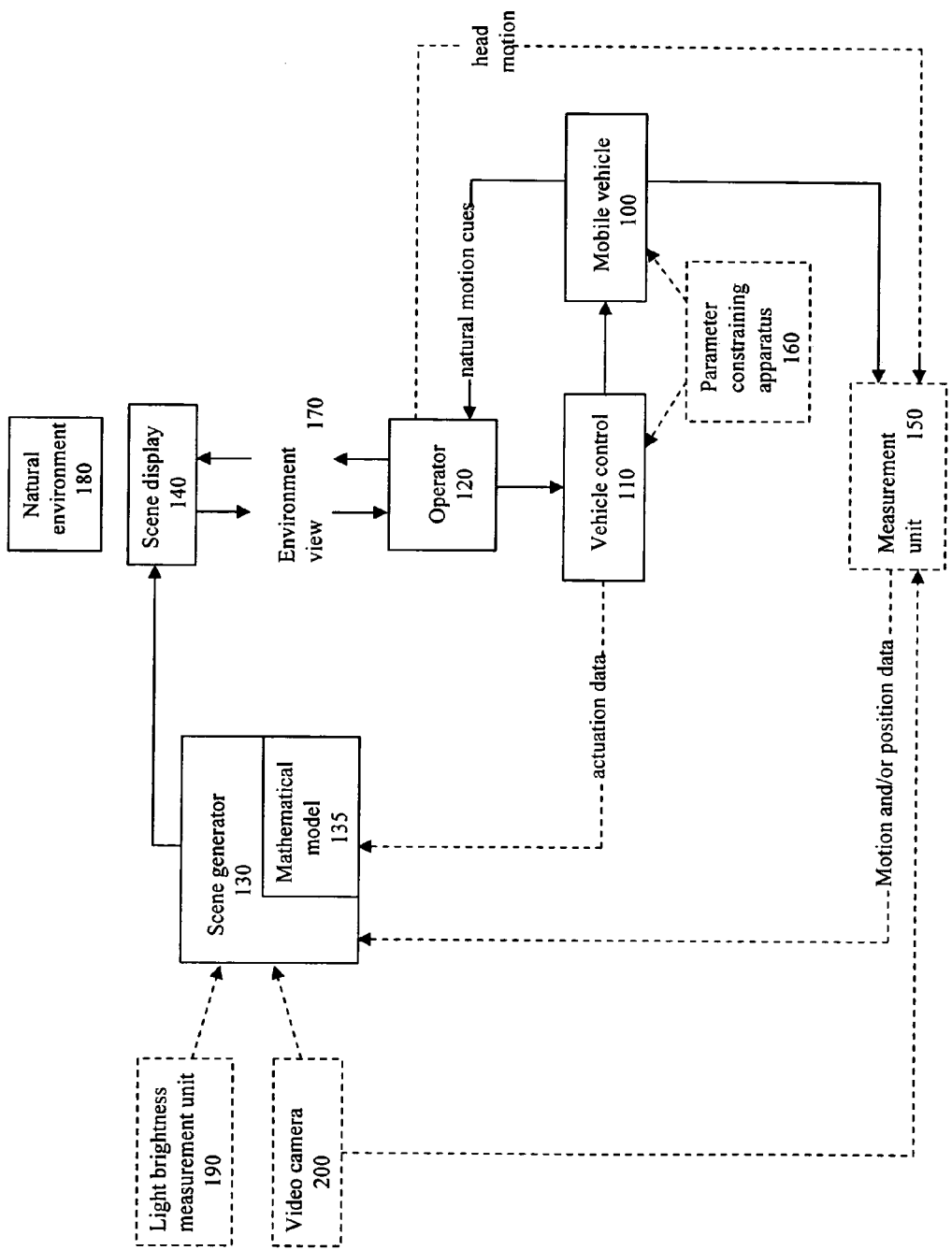
Figure 3. Interacting elements of the invention

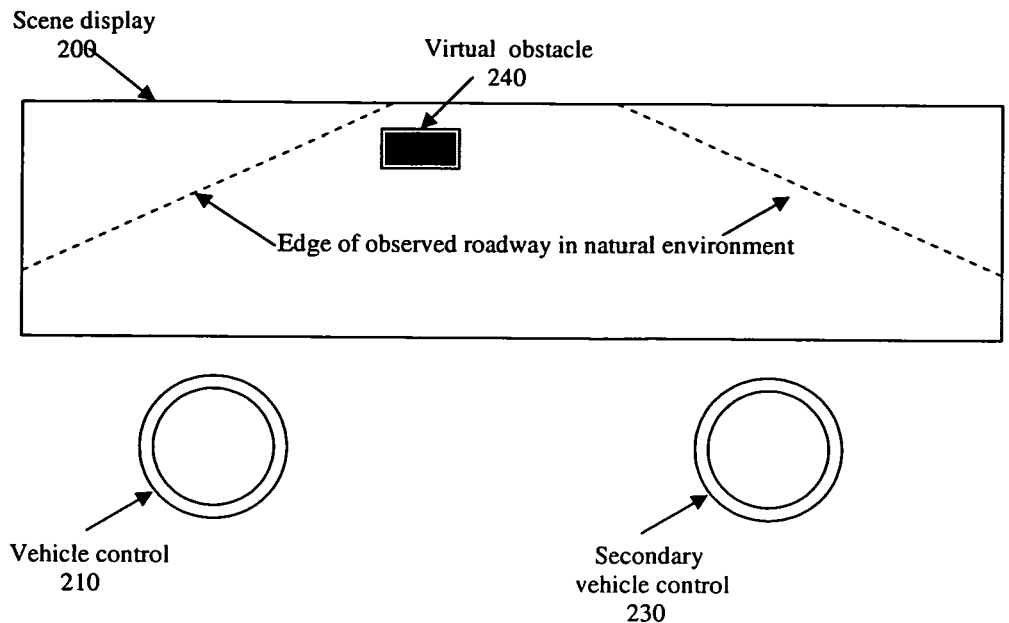
Figure 4. Operator view of forward scene from the interior of the actual vehicle
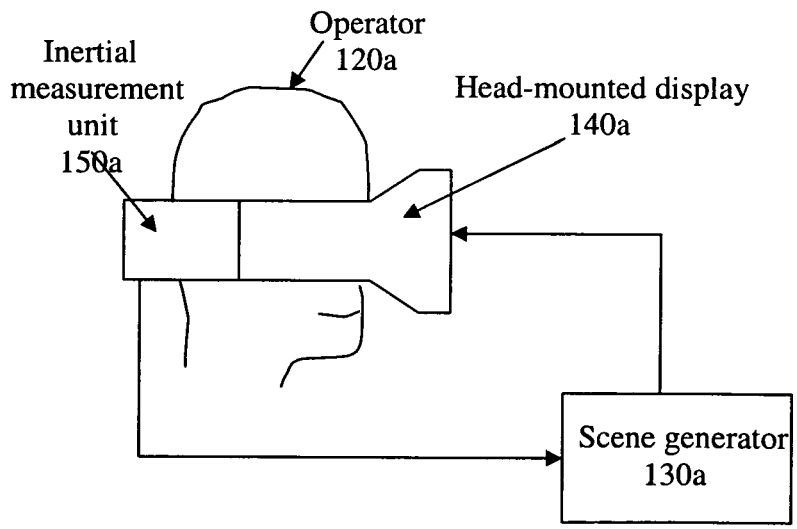
Figure 6A

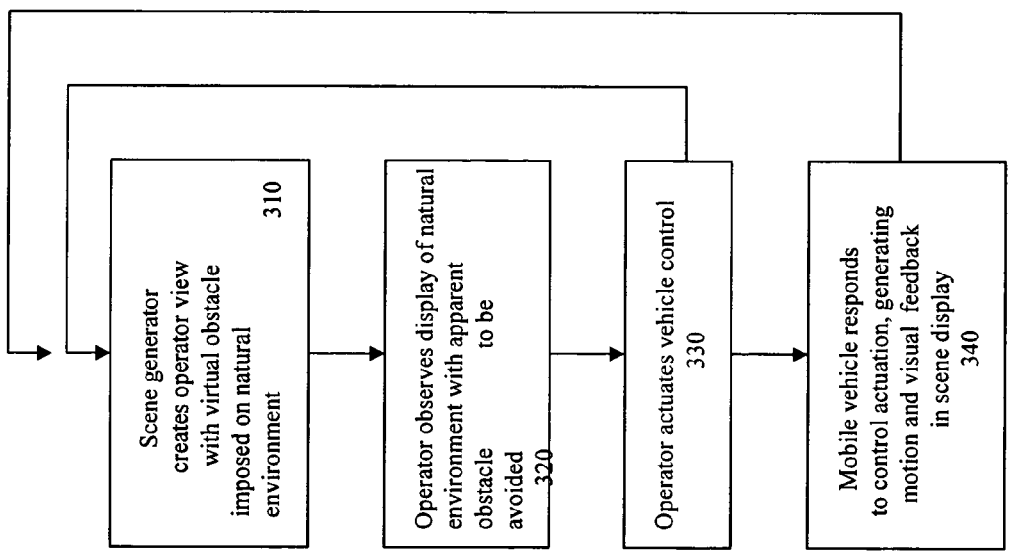
Figure 5. Flow diagram of the simulation process

VEHICLE OPERATIONS SIMULATOR WITH AUGMENTED REALITY

CROSS REFERENCES TO RELATED APPLICATIONS

This application claims the benefit of priority from previously filed provisional application entitled "Hybrid Vehicle Simulator," filed on Oct. 23, 2000, with Ser. No. 60/242,614, and the entire disclosure of which is herein incorporated by reference.

This application is a continuation of utility application filed on Oct. 23, 2001 now abandoned, with Ser. No. 10/001,362, and the entire disclosure of which is herein incorporated by reference.

FIELD OF THE INVENTION

This invention relates to vehicle simulation, and more particularly to methods and apparatus for providing in a safe and effective manner the experience of observing potential collision obstacles or other hazard images to the human operator of an otherwise conventional vehicle, (such as an automobile or aircraft) moving in a normal manner in a natural environment (such as an outdoor test track).

BACKGROUND

Since the advent of computer technology first made them possible, vehicle simulators have been used for a number of purposes, including research, training, and vehicle engineering. Simulators have become increasingly prevalent and useful for reproducing the experience of operating aircraft, motor vehicles, trains, spacecraft, and other vehicles. Aviation simulators have become particularly prevalent, with nearly every airline now using simulators for training and research—the first time a commercial pilot flies a new aircraft, it is often filled with passengers. The military services use simulators extensively for training personnel in the operation of ships, tanks, aircraft, and other vehicles.

Despite their varied usage, simulators, especially those providing the operator(s) with motion cues, have primarily remained the tools of large organizations with significant financial resources. The use of motor vehicle (i.e., driving) simulators has not yet progressed beyond manufacturers, suppliers, government agencies (including the military), and academic institutions, largely because of their cost. However, driving simulators have a number of valuable safety applications. First, they offer research into driver response behavior. Highways are becoming populated by more vehicles, moving at greater speeds, with a greater portion of drivers comprised of older adults with reduced sensory and response capabilities. Cellular telephones, navigation systems, and other devices (often developed by third parties and added to vehicles without suitable integration with manufacturer-supplied devices) place increased demands on the driver's attention, and drugs continually arrive on the market that affect driver alertness. These factors mandate a better understanding of driver limitations, particularly those of older drivers. Researching driver behavior in emergencies by examination of real accidents has limited yield, because every accident is unique to some extent, determining causation is difficult, and controlled experimental research is inherently not possible for real accidents. Driving simulators could provide data on the driver's response to emergency situations without exposure to actual risk.

Second, simulators can provide an improved means for training and evaluating drivers. Most driver training is conducted either in classrooms or in automobiles in normal traffic, which rarely exposes trainees to unexpected hazards. Devices that would allow trainees to experience potential collision situations, visibility hazards, or other unusual driving situations, without actual exposure to risk would provide useful training.

Third, simulators provide manufacturers and suppliers useful data from which to further develop their products. Vehicle manufacturers, suppliers and car/truck fleet owners usually perform developmental tests in actual vehicles, but this is limited to experiences not involving collision or other hazards. The use of simulators to perform these functions is costly, particularly for programming and measuring motion and configuring the simulator to represent the appropriate vehicle, limiting the usefulness of these simulators for most research applications.

Simulators are primarily tasked with recreating the sensory cues their "real-world experience" counterparts offer. Most state of the art simulators do a credible job recreating visual and audible stimuli, but only the most expensive provide credible cues for the vestibular senses (controlled by semicircular canals in the inner ear, which sense rotary acceleration, and otolith organs, which sense translational acceleration) and the muscle and joint sensors of motion. Motor vehicle simulators, in particular, struggle to provide a faithful motion representation without exorbitant cost. Because of the cost of providing such functionality, relatively few driving simulators even attempt to provide motion cues, despite the fact that tests reveal subjects tend to over-steer or experience vertigo because of a mismatch between visual and motion cues. Those that provide motion cues usually do so with an expensive hydraulic simulator base, but very few motion-base driving simulators are in use, and even these lack the ability to accurately convey translational acceleration. Some state of the art simulators promise to rectify this problem, but this capability typically entails a significant cost. Clearly, simulators that represent motion cues faithfully are not cost-effective research or training tools for most applications. FIG. 1 shows the state-of-the-art National Advanced Driving Simulator operated by University of Iowa for the Department of Transportation. Motion fidelity requires the test driver to ride inside a cab moving on a 20×20 meter X-Y hydraulic motion platform while viewing a computer-generated 360 degree screen.

The same financial barriers that prevent more widespread use of driving simulators have also prevented the development of simulators for the operation of wheelchairs, skis, snowboards, and many other vehicles which move, sometimes at high speeds, when in actual operation. Clearly the availability of more cost-effective simulators could enable better research, training, and engineering, resulting in safer and more user-friendly vehicles, both those indicated above and others, and in better, safer operation thereof.

SUMMARY OF THE INVENTION

The present invention overcomes the cost and motion fidelity issues of other vehicle operation simulators with a novel combination of already commercially existing devices plus some additional instrumentation. In order to generate realistic motion cues, the operator is carried by and operates an actual vehicle. Vehicle examples include but are not limited to an automobile, motorcycle, aircraft, wheelchair, bicycle, skis, and a ship. According to one aspect of the invention, the vehicle is operated in a "natural environment" using its normal vehicle control, and in accordance with visual, motion and audible cues provided partly by the natural environment and partly by a virtual reality device. The natural environment may be an open space (e.g., a large field or a parking lot), a track, an unused or seldom used roadway, snow-covered mountain slope, air space, or other environment appropriate for the mobile vehicle being used. The virtual reality device takes advantage of recent advances in computer processing and image generation speeds to create a realistic vehicle operation environment, including hazards which are not present in the actual/natural environment. Thus the invention provides realistic motion cues at reasonable cost, thereby creating training, research, and product development opportunities not previously possible.

In its most preferred embodiment, the present invention is operated in a large, open area free of obstacles and hazards. Since its intent is to provide a realistic vehicle operation experience, these areas provide the greatest opportunity to simulate all types of uninterrupted operation experiences. For example, if the invention were to simulate the operation of an automobile, it would be difficult to simulate driving on a highway for any useful period if the invention were used in an urban area, or even in a small field. However, for certain uses, it is envisioned that the invention may be operated on certain less-trafficked roads or streets.

The present invention provides both apparatus for a vehicle operation simulator and a method for simulating vehicle operation. The apparatus includes a mobile vehicle having vehicle controls, a scene generator, and a scene display that receives input from the scene generator and presents at least a partial virtual environment view to the operator of the vehicle. A method for use includes the scene generator creating through conventional computer graphics software at least one element within an environment view, transmitting an electronic signal comprising the at least one element within the environment view to the scene display, the scene display presenting the environment view to the vehicle operator, and, based on resulting operator actuation of vehicle control or vehicle movement, regenerating the environment view to provide continually updated cues to the operator, including visual and/or audible cues.

The scene display may present the operator an environment view consisting of artificial elements (produced by the scene generator) or a combination of artificial and natural elements. The components of the scene display may, for example, include a head-mounted display, a computer projector or monitor, and/or a projection screen which is either partially transparent (e.g., half-silvered) or opaque (e.g., a flat screen). Depending on the equipment used, the environment view may consist of a viewable image presented within the head-mounted unit worn by the operator, an image projected onto flat or curved screens in front of or behind the windshield and/or side and rear windows, or images projected onto a semi-transparent screen so as to superimpose artificial elements on the operator's view of the surrounding natural environment.

The scene generator transmits an electronic signal to the scene display comprising at least one element within the environment view, which includes the appropriate location of natural and artificial images within the display. Through conventional computer graphic software the scene generator continually regenerates the environment view for display to the vehicle operator via the scene display. The scene generator may alter artificial images within the environment view in response to vehicle movement, operator actuation of vehicle controls, and predetermined artificial image movement. Said scene generator alteration is established simply by measurement of the position of the vehicle relative to the natural environment and moving the virtual image in compensation. Said position measurement can also be by time-integrating the velocity measurement, or by double time-integrating the acceleration measurement, or by prediction of the relative change of vehicle to environment based on a mathematical model, which may be computer-based, of how the vehicle responds in time to control inputs. Thus components of the scene generator may include a general-purpose programmed computer, and a means for transmitting a signal to the scene display. In such manner, for example, a virtual image of a potential collision hazard that is at a fixed location on the roadway can be made to appear fixed at that same location even as the displayed scene of the natural environment on the roadway changes to a different viewpoint because of vehicle position change.

The environment view may be presented to the vehicle operator to suggest behavior—for example, a velocity—different from the actual behavior exhibited by the vehicle. In these embodiments, a mechanism may be employed to allow the vehicle to respond to control actuation as though the vehicle were behaving as shown in the environment view. For example, the environment view might be presented to the operator of an automobile as though it were travelling at 70 miles per hour, when the vehicle actually is travelling at only 35 miles per hour. This mechanism might alter the operator's actuation of the steering wheel, for example, to cause a much sharper turn than under normal operation at 35 miles per hour, or at least to provide a simulated view of such a sharper turn.

The scene generator may take one or more forms of vehicle and operator movement and/or position data multiple as input. These may include acceleration data from an accelerometer or gyroscopic inertial measurement unit, velocity data from a unit which measures either translational or rotational velocity in up to six degrees of freedom, or position data from a positional measurement instrument, such as a charge-coupled detector (CCD) camera affixed to the vehicle that locks onto a fixed environmental object such as a traffic cone, detects its relative motion in the CCD, and thus determines positional change of the vehicle relative to the roadway.

A mechanism may be used to maintain equivalent light brightness between a natural environment seen outside the vehicle and an image superimposed on the display of said natural environment. For example, embodiments in which images are projected on to a semi-transparent screen so as to superimpose artificial elements on a natural environment will need to calibrate the brightness of such images to the brightness of the natural environment in order to present a realistic operating environment. This mechanism may include a component mounted on the exterior of the vehicle to take light brightness measurements of the natural environment. This mechanism provides these measurements to the scene generator, continually incorporating any shifting brightness of the environment into the generation of artificial images so that they remain realistic under changing conditions.

The vehicle may employ secondary vehicle controls to enhance operator safety, such that the vehicle responds exclusively to the secondary controls operated by another person, or to both controls when the secondary controls are actuated. This secondary vehicle control might be used in instances where only a secondary operator can see the actual movement of the vehicle in relation to the natural environment, and might, in an automobile for example, include conventional dual controls used in driver training vehicles.

The vehicle may employ parameter-constraining apparatus that acts to restrict the movement of the vehicle or the actuation of vehicle control. In one example, on a wheelchair this apparatus might restrict movement to prevent it from exceeding certain speeds. In another example, on an airplane this apparatus might restrain control actuation to prevent a roll so sharp it would disorient the operator or stall the aircraft. In a third example, an automobile steering wheel might be constrained from allowing a turn so sharp or so quick that the vehicle stability would be jeopardized.

All components of the system are commercially available components, but these are combined in a novel way. Measurement of vehicle position relative to the natural environment by means of acceleration, velocity, or direct position instrumentation, or by means of a mathematical model (may be computer-based) of vehicle response to control input, are all techniques known to a person skilled in the art of instrumentation and electromechanical simulation.

Further features and advantages of the present invention, as well as the structure and operation of various embodiments of the present invention, are described in detail below with reference to the accompanying drawings. In these drawings, the same or equivalent reference numerals are used to represent the same element in the various figures

BRIEF DESCRIPTION OF THE DRAWINGS

FIG. 1 is an illustration of a state-of-the-art driving simulator, as previously mentioned.

FIG. 2 is an illustration of the driver in a vehicle moving along a roadway in a natural environment observing on a scene display an image that is partially a rendering of the natural environment and partially a computer-generated rendering of a (virtual) automobile, correctly positioned on the roadway by the relative position measurement returned from the camera or some other conventional vehicle position, velocity or acceleration instrument or a model of vehicle response to control change.

FIG. 3 is a block diagram of an illustrative embodiment of the invention.

FIG. 4 is a view from the operator's perspective of an illustrative embodiment.

FIG. 5 is a flowchart illustrating operation of the invention.

FIGS. 6A, 6B, 6C, and 6D are diagrams illustrating four different ways in which the invention may be implemented.

DETAILED DESCRIPTION

Figure 6B:
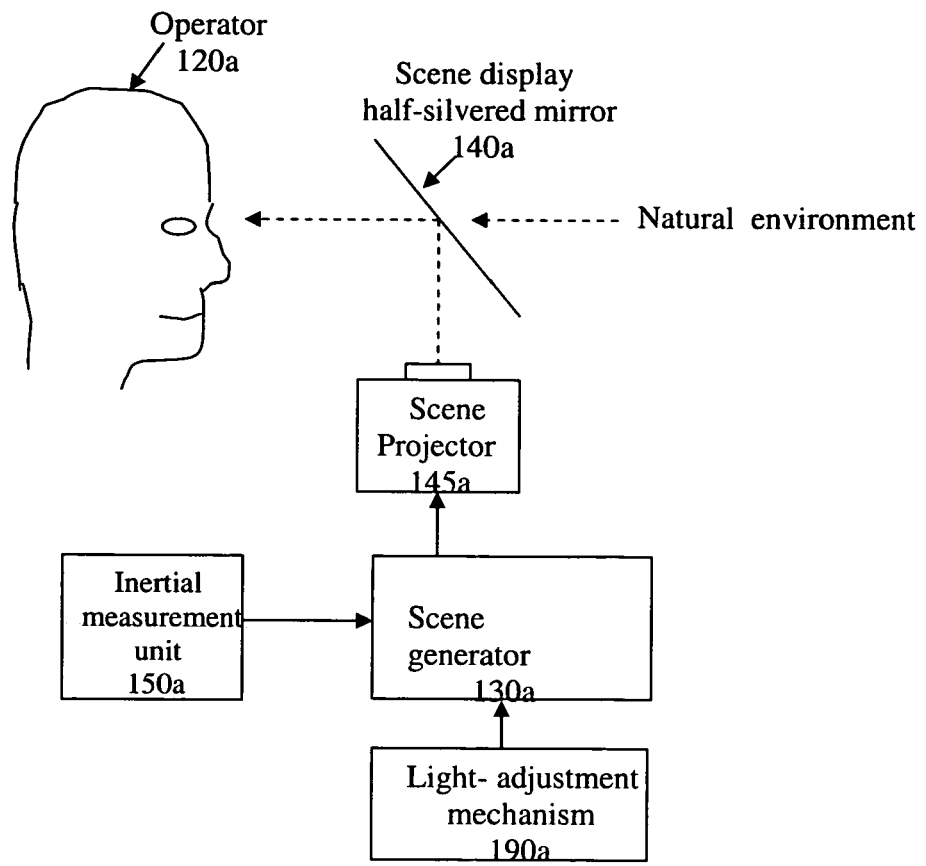

Referring to FIG. 3, the vehicle operation simulator for an illustrative embodiment includes a mobile vehicle 100, which may be any vehicle that moves with at least one degree of freedom, for which movement represents an ordinary feature of operation, and which includes at least one component for regulation or control of said movement. Examples include, but are not limited to, an automobile, aircraft, ship, truck, railroad train, motorcycle, wheelchair, bicycle, snowboard, roller skates, and skis. Mobile vehicle 100 may be operated in a natural environment; for example, in an open space appropriate to the mobile vehicle. This open space should be large and preferably free of other vehicles, potential hazards, and pedestrians. However, it is also contemplated that the invention be practiced on unused or seldom-used tracks, streets, air space, snow slopes, roadway, or other environment on which the particular vehicle 100 might normally be operated.

A scene generator 130 is provided which generates an electronic signal and transmits it to scene display 140, which presents an environment view 170 to human operator 120. Typically, the scene generator includes a programmed general-purpose computer to generate images and sounds associated with a virtual environment which may include obstacles and hazards, including, but not limited to, other vehicles, animals, people, or fixed objects. These computer-generated elements typically exhibit behavior and characteristics of their real-world counterparts. For example, a computer-generated image of a person might be animated so as to appear to cross the street in front of the mobile vehicle 100. It should be noted that other equipment might also provide the functionality of the scene generator 130 including, for example, an array of projectable photographic or video images onto the display.

In some embodiments, the environment view is completely artificial. In one example, the environment view may include a computer-generated artificial background, at least one computer-generated artificial element, and have no elements taken from the natural environment surrounding the mobile vehicle. In other embodiments, the environment view may be comprised of a composite of natural elements and artificial elements. In one example, computer-generated artificial elements might be superimposed on a display screen that also allows the view of a natural environment to pass through. In another example, the scene generator would superimpose computer-generated artificial elements against a backdrop of a color video signal of the actual natural environment, or of a selectively modified natural environment. For example, a simulation conducted during the day may be modified to simulate night driving. The scene generator may also receive input on the state of the natural environment from, for example, vehicle-mounted cameras, and use this input in generating at least one element within an environment view that is related in predetermined ways to the actual environment.

The scene display 140 may take many forms. In some embodiments, the scene display is a head-mounted display that presents the environment view in the field of vision of the operator, and allows for a realistic field of vision no matter how the operator's head is oriented or where in his field of vision the operator's eyes are focused. In other embodiments, the scene display includes a electronic (computer) display and/or a projection unit affixed to the vehicle. Either the head-mounted or fixed display may include a half-silvered mirror, allowing the items projected on to the half-silvered mirror and the natural environment 180 behind it to comprise the environment view. In other embodiments, the scene display includes a projection unit and a flat screen, either diffusing the image through it or reflecting from it, depending on whether the projector is in front of or behind the screen, and thereby constructing an environment view 170 consisting entirely of projected elements. The environment view may consist of images projected on a single surface or, where appropriate, multiple surfaces. For example, the simulation of the operation of a helicopter might require the use of multiple display surfaces to present the operator simulated views above the airplane and on either side, as well as in front.

In some embodiments the operator's actuation of vehicle control 110 is input to a computerized mathematical model 135, which may run on the same computer as the scene generator. This model, which incorporates equations that predict the vehicle position in response to operator control inputs much as in any driving simulator, may then provide input to scene generator 130, causing the scene generator to alter the environment view presented on the scene display as appropriate to compensate (by simple subtraction) for vehicle orientation and/or position, and the operating environment thus to be simulated.

Data on vehicle activity may also be provided to the scene generator via the measurement unit 150. This unit may measure the velocity of the vehicle (by measuring, for example, an automobile's wheel rotation and angle), measure its translational or rotational acceleration (for example, with an accelerometer, or inertial acceleration measurement unit or gyroscopic sensors), or measure changes in its position (using, for example, a global positioning system device, or optical CCD camera or laser triangulation locking on a fixed light or object in the environment easily recognizable in the operating area by the scene generator computer). Regardless of the measurement device used, however, this velocity, acceleration, or position data will encompass up to six degrees of freedom including translation and rotation. In one example, the measurement unit might discern a ship's velocity by combining measurements of water flow past a predetermined point on the ship's hull with measurements of the rudder angle over time. In another example, the measurement unit might discern an automobile's acceleration or deceleration relative to the ground and/or gyroscopic changes in its heading over time. (The use of inertial, position, and velocity measurement units will be well-known by those skilled in the art.) Data from either of these measurement units may supplement or replace input from vehicle control 110 to a model which then predicts vehicle position. The scene generator may then alter the environment view as appropriate given the mobile vehicle's movement (i.e., changes in angle or position relative to the earth) using conventional computer graphic transformations of image geometry. As is well known to any engineer position may be derived by time-integrating velocity, or time-double-integrating acceleration. Use of this vehicle (angular or translational) position data to compensate for vehicle position by displacing the virtual image on the display in the opposite direction from the vehicle motion is also a well-understood technique.

Operator 120 actuates vehicle control 110 to control mobile vehicle 100, triggering resulting cues to the operator's motion sense organs. Some embodiments may employ additional features to ensure the safety of the operator. For example, air bags and lap belts may be used to secure the operator in place during operation. Either vehicle control 110, or the motion of mobile vehicle 100, may be constrained by parameter-constraining apparatus 160. The parameter-constraining apparatus may comprise a computer system designed to assume control of the vehicle under certain hazardous conditions, a governor mechanism designed to limit vehicle velocity, or a mechanism limiting turn radius, angle of descent and/or other motion parameters. This apparatus may restrain motion either totally or in a manner dependent on vehicle operating conditions. The constraints may limit actuation of vehicle controls, but preferably limit the response of the vehicle to the controls.

Depending on the embodiment, scene generator 130 may also take input from light brightness measurement unit 190 and video camera 200. A light brightness measurement unit may provide data enabling the scene generator to maintain consistent brightness between the natural environment and any artificial elements and/or objects that are superimposed. Therefore, this unit may be mounted or otherwise affixed to the vehicle so as to enable measuring the light brightness of the environment view as seen by the operator, as will be appreciated by those skilled in the art.

One or more charge-coupled (CCD) or video cameras may provide one or more video signals depicting the natural environment, for use when the natural environment is not otherwise visible to the operator. Therefore the video camera(s) may also be mounted or otherwise positioned on the vehicle's exterior or on the operator's head so as to capture the visible elements of the natural environment from a perspective collinear with the operator's field of vision; methods for appropriate capture of the natural environment using video camera apparatus will also be well-known by those skilled in the art. While the camera(s) may provide a video image directly to scene display 140, it is preferable that camera output be provided, as shown, to scene generator 130, where it may be used to reproduce either the actual—or a modified version of—the natural environment.

FIG. 4 depicts the interior of mobile vehicle 100 which, for the illustrative embodiment, is automobile 200 with controls 210 including a steering wheel, an accelerator, a brake, and other suitable controls such as a gear shift, clutch, de-fogger, etc. (controls not shown). Scene generator 130 may be a programmed general-purpose computer stored within automobile 200. A half-silvered mirror 220, integrated with or separate from the vehicle's windshield, or attached to the head-mounted display, receives either projected images from a projector (not shown) situated within automobile 200 (in the case of a screen display), or a signal from the scene generator (in the case of the head-mounted display). Either the image projector or the head-mounted unit, combined with the half-silvered mirror 220, form scene display 140. Obstacles 240 are placed in the environment view such that it appears superimposed on the natural environment also viewable through the half-silvered mirror 220.

Some embodiments may also include a secondary vehicle control 230 to promote the safe operation of the automobile. A secondary vehicle operator, who monitors the operator's actions and corrects or overrides vehicle control actuation that would result in danger or injury, operates secondary vehicle control 230. The secondary operator may experience the same environment view as the operator, may experience only the natural environment, may experience both environments (for example, on a split screen view), or may experience some other view appropriate to maximize safe operation of the vehicle.

FIG. 5 is a flow diagram of a method for simulating vehicle operation utilizing the apparatus of FIG. 3. In step 310 an environment view is created, which may consist of artificial objects designed to wholly comprise the environment view, or artificial elements intended to be superimposed on natural elements to comprise the environment view. The scene generator transmits these elements to the scene display. In step 320, the scene display presents the environment view to the operator. In some embodiments, if scene display is accomplished via projection on a viewing surface, the viewing surface may encompass the field of vision regardless of the operator's head movement—i.e., the viewing surface will allow the operator to see a projected image in all relevant directions for the particular vehicle.

In step 330, the operator actuates vehicle control in accordance with the environment view. The actuation of vehicle control will include at least one operator act—for example, applying rotational force to a steering wheel, controlling force on an accelerator, applying force to a brake pedal, applying force on one edge of a snowboard, and/or applying force on the control stick of an airplane.

As shown in step 340, the vehicle responds to actuation of the vehicle control. In some instances, parameter-restraining apparatus may be employed to restrict vehicle movement, to enhance operator safety or for other reasons. This apparatus may act to restrain control actuation by, for example, preventing the operator from applying more than a predetermined downward force on the accelerator, or from applying more than a predetermined rotational force on the steering wheel. This apparatus may alternatively (or in addition) restrict vehicle movement resulting from operation of the control by, for example, preventing the vehicle from exceeding a predetermined speed or executing an overly sharp turn. The scene generator may react to the controls as operated, or to the constrained control operation or vehicle movement.

The actuation of vehicle control in step 330 and/or vehicle movement in step 340 will provide input to the regeneration of the environment view in step 310. When the vehicle responds to control actuation, one or more position (directly measured or calculated by integration on velocity or acceleration) sensors may provide input to a simple real-time mathematical calculator continuously repositions the virtual image in the scene generator in the opposite direction of vehicle movement. Thus if the vehicle turns left the virtual image on the display moves right by a proportionate amount. In either case, the scene generator processes this input to update at least some elements within the environment view, and the scene display presents the environment view to the operator. The frequency of this update will vary based on the processing power of the computer within the scene generator, but may take place hundreds of times of times per second to give the impression of reality.

In some embodiments, the scene generator may create elements of an environment view that do not coincide with the actual behavior of the vehicle. In these embodiments, a mechanism may supplement, detract from, or otherwise alter the force applied by the operator to actuate vehicle control and/or the vehicle response to such actuation, in order to simulate vehicle control actuation under the conditions presented in the environment view. For example, if the environment view is presented to simulate an automobile moving at 70 miles per hour, but the vehicle is actually moving at 35 miles per hour, a mechanism may translate a rotational force the operator applies to the steering wheel to a much sharper actual turn of the front axle, consistent with a velocity of 70 miles per hour. Also, for example, if the environment view is presented to simulate an automobile traveling in the snow, a mechanism may translate the downward force applied to the brake pedal to a much weaker force, or otherwise alter the force, actually applied to the brake pads to simulate deceleration in slippery conditions. Those skilled in the art will be able to offer several methods through which this may be accomplished. Regardless of the method employed, data on the operator's actuation of vehicle control will be fed to the scene generator for continual regeneration of the environment view.

FIGS. 6A-6D depict alternative components suitable for use in implementing the apparatus depicted in FIG. 3. Components within FIGS. 6A-6D are numbered according to the corresponding component from FIG. 3 and given alphabetic suffixes corresponding to the specific figure. In some instances, particular components shown in FIG. 3 comprise more than one component shown in FIGS. 6A-6D; in these instances identifiers are assigned in FIGS. 6A-6D so as to indicate a numeric association between the components For example, scene display 140 in FIG. 3 equates to scene display half-silvered mirror 143B and scene display projector 145B in FIG. 6B.

Referring to FIG. 6A, operator 120A wears head-mounted scene display 140A. This head-mounted display receives a signal from scene generator 130A. Depending on the vehicle whose operation is to be simulated, the display may consist of, for example, a roughly planar surface and three-dimensional elements therein (for simulation of automobile operation, for instance), or a relatively unobstructed view of the open space before the vehicle (for an airplane, for instance). The head-mounted display and scene generator are capable of presenting the vehicle operator with an environment view commensurate with head movement toward the left, right, up, or down, and commensurate with vehicle movement, since the operator remains in a relatively fixed position within the vehicle. At any one time, however, it presents the operator with an environment view comprised of the operator's field of vision given his/her head orientation. Thus, the operator's environment view varies as a function of both vehicle movement or position, and of head movement or position.

The inertial measurement unit (IMU) 150A ascertains acceleration of the operator's head relative to the environment (which is the head relative to the vehicle plus the vehicle relative to the environment), and provides this input to scene generator 130A so as to regenerate the environment view for rendering on the head-mounted scene display. The scene generator maintains a realistic simulation of the operator's field of vision by accepting data on head and vehicle acceleration from the IMU, regenerating the environment view based on this data, and transmitting it to the head-mounted scene display 140A. Those skilled in the art will be able to make the proper connections and electronic subtraction as described above, and determine suitable power sources for the scene generator, IMU, head display, and video camera, such that the risk of equipment failure and resulting operator danger due to power outage is minimized.

Depending on the vehicle used, and other factors, the scene generator may be secured within the vehicle, or may be a portable unit that can be worn or otherwise held by the operator while the mobile vehicle is in motion.

FIG. 6B depicts another illustrative embodiment of the invention, wherein operator 120B observes the environment view through half-silvered mirror 143B, which is sufficiently transparent to allow the operator to view the natural environment 180B through it, and sufficiently opaque to allow the operator to view artificial images projected by scene display projector 145B. The scene generator 130B transmits a signal consisting of artificial elements to be displayed and their location in the environment view, among other data, to the scene display projector, and the scene display projector projects the image on half-silvered mirror 143B. Thus the composite image/environment view 170B viewed by an operator is a combination of natural elements from the scene ahead and superimposed artificial elements rendered on the scene display.

Although the half-silvered mirror is depicted in FIG. 6B as a flat, windshield-like screen, other embodiments might employ a cylindrical half-silvered mirror mounted to the vehicle structure, a cylindrical half-silvered mirror mounted to the operator's head, or other variations.

The measurement unit 150B provides input on the vehicle's velocity to the scene generator so that artificial elements within the environment view can be updated appropriately for presentation by the scene display projector. The scene generator accepts this input on the vehicle's position to continually regenerate the environment view. A light brightness equivalence mechanism 190B measures the intensity of light outside the vehicle and provides this input to the scene generator. The scene generator then adjusts the brightness of images to be superimposed by scene display projector 145B, so that composite image 170B constitutes a realistic rendering of an operating environment. This aspect of the invention may be especially important for vehicle operation during periods of low sunlight, during periods of especially bright daylight, or in instances of high glare.

The scene generator, the scene display projector, the measurement unit and the light brightness equivalence mechanism may be stored within or mounted upon the vehicle.

Figure 6C:
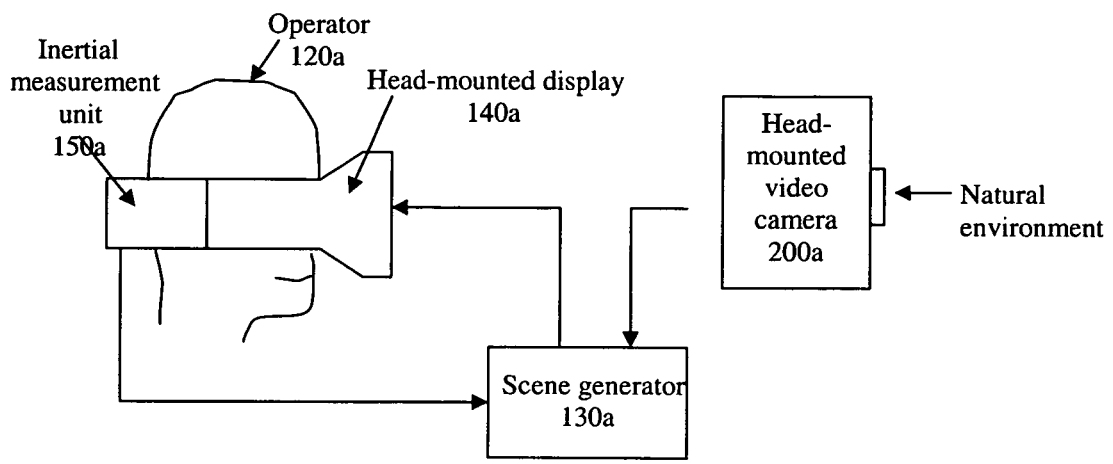

FIG. 6C depicts another embodiment of the invention, which is the same as FIG. 6A except that the scene generator 130C receives input from a CCD or video camera 200C, which is mounted on the operator's head so as to be collinear with the operator's view. This video signal may depict the natural environment, or it may be altered before presentation to the operator in a predetermined fashion. In an illustrative embodiment, scene generator 130C alters the signal sent by video camera 200C to insert artificial elements and their location into the environment view, and in some cases also makes selected variations in the natural environment. Thus, operation of the vehicle at night might be simulated during daylight hours. This altered signal is then input to head-mounted scene display 140C. A scene generator may be mounted on or within the vehicle, or may be a portable unit that can be worn or otherwise held by the operator while the vehicle is in motion.

Figure 6D:
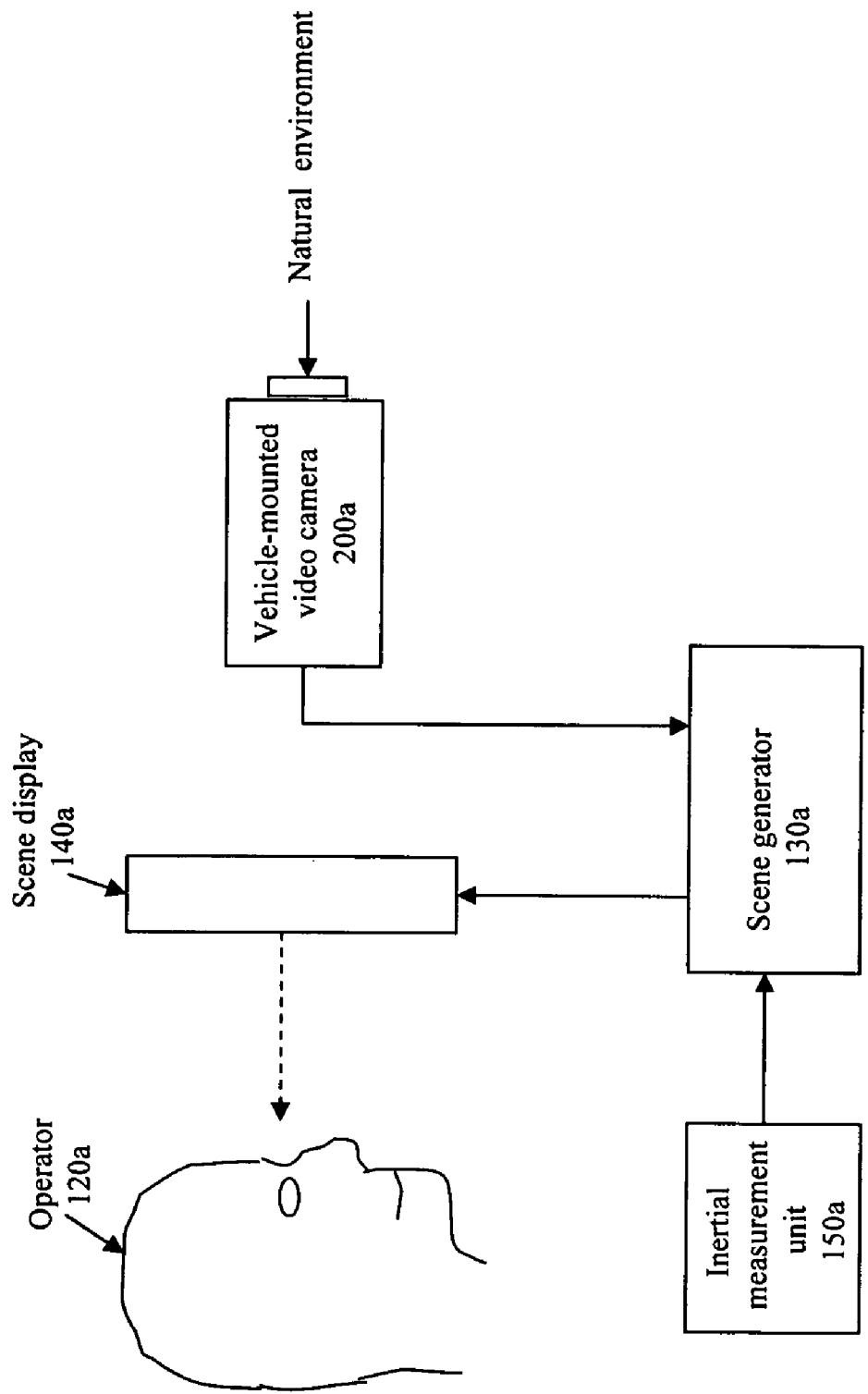

The inertial measurement unit 150C affixed to the head-mounted display provides input on the acceleration of the vehicle and/or the operator's head. When the head-mounted display is used, additional measurement of head orientation or position, and/or of operator position within the vehicle, may be provided by means of an electromagnetic sensor and/or mechanical linkage sensor with a potentiometer (not shown) affixed to the vehicle. This may prove useful for simulating the operation of a vehicle which may requires the operator to move about within the vehicle's interior (e.g., a ship or railroad car). The scene generator will combine data provided by the sensor(s) and other measurements of the vehicle's and operator's position to provide an accurate environment view to the operator. FIG. 6D depicts another embodiment of the invention, which is largely the same as FIG. 6B except that video camera 200D provides input to scene generator 130D in the form of a video image collinear with the operator's view, and operator 120D views an image projected on flat screen 140D. A measurement unit 150D transmits input on vehicle position, provided by means which may include a global positioning system (GPS) unit, optical sensor such as a camera or laser triangulation fixating on an object within the operating area, or other position measurement techniques, to the scene generator. In a preferred embodiment, the scene generator manipulates the signal sent by the video camera, which may depict the natural environment, to insert artificial elements and their location. This altered signal is then fed to scene display projector 140D, which projects environment view 170D on to the screen.

While in the discussion above, head and vehicle movement and position have been measured to control the scene generator, in some applications other movements may be monitored, as appropriate, to provide a realistic simulation of vehicle operation. Thus, while the invention has been particularly shown and described with reference to specific embodiments, and variations thereon have been indicated, it should be understood by those skilled in the art that various additional changes in form and detail may be made therein without departing from the spirit and scope of the invention as defined by the following claims.

The invention claimed is:

1. A mobile vehicle operation and hazard encounter simulator comprising:
    a vehicle having at least one vehicle control and operated to move freely in a natural environment and thereby provide normal non-visual motion cues;
    a scene generator;
    a scene display in communication with said scene generator and viewable by a vehicle operator;
    an environment view being presented on said scene display created at least in part by said scene generator; and
    at least one virtual image not existing in said natural environment and visually superposed on said natural environment by the scene generator into said environment view and presented on said scene display so as to appear fixed or moving in a controlled fashion in said environment view,
    wherein said mobile vehicle operation and hazard encounter simulator carries said vehicle operator and is controlled by said vehicle operator in accordance with said environment view, said vehicle responding to actuation of said at least one vehicle control and said environment view responding to at least one of said at least one vehicle control, operator movement, and vehicle movement.

2. The mobile vehicle operation and hazard encounter simulator of claim 1, wherein at least one object from said natural environment is captured with a video camera and input to said scene generator.

3. The vehicle operation and hazard encounter simulator of claim 1, wherein said at least one object from said natural environment is visible to said vehicle operator through a partially transparent viewing screen.

4. The vehicle operation and hazard encounter simulator of claim 1, further comprising an instrument attached to and measuring a position change of said simulator relative to said natural environment in at most six degrees of freedom by sensing at least one of acceleration, velocity, and position, wherein an output of said instrument proportionately repositions said virtual image on said scene display in an opposite direction from said position change.

5. The vehicle operation and hazard encounter simulator of claim 4, further comprising a computer-based model of position response to said at least one vehicle control, wherein an output of said computer-based model proportionately repositions said virtual image on said scene display in an opposite direction to said position change.

6. The vehicle operation and hazard encounter simulator of claim 4, further comprising a device capable of detecting relative motion of objects in said natural environment and measuring said position change relative to said natural environment in at most six degrees of freedom, wherein an output of said device proportionately repositions said virtual image on said scene display in an opposite direction to said position change.

7. The vehicle operation and hazard encounter simulator of claim 1, wherein said scene display is affixed to at least one of said vehicle operation and hazard encounter simulator and a head-mounted display worn by said vehicle operator.

8. The vehicle operation and hazard encounter simulator of claim 1, further comprising at least one of an electromagnetic position sensor and a mechanical arm with angle sensor attached to and responding to changes in position of said vehicle operator's head in relation to said simulator in up to six degrees of freedom.

9. The vehicle operation and hazard encounter simulator of claim 1, wherein said environment view comprises only elements generated by said scene generator.

10. The vehicle operation and hazard encounter simulator of claim 1, wherein said environment view is a composite of at least one element from said scene generator and at least one element from the natural environment.

11. The vehicle operation and hazard encounter simulator of claim 10, wherein said scene generator includes a mechanism for maintaining equivalent light brightness between at least one element from said scene display and said natural environment.

12. The vehicle operation and hazard encounter simulator of claim 1, wherein a part of said environment view differs in a controlled fashion from actual behavior of said simulator.

13. The vehicle operation and hazard encounter simulator of claim 12, wherein said simulator responds to an actuation of said at one vehicle control in accordance with movement represented in said environment view rather than actual movement of said simulator.

14. The vehicle operation and hazard encounter simulator of claim 1, further comprising a secondary vehicle control for said simulator, said secondary vehicle control being actuated by a second operator.

15. The vehicle operation and hazard encounter simulator of claim 14, wherein said simulator selectively responds to said secondary vehicle control or said at least one vehicle control when said secondary vehicle control is actuated.

16. The vehicle operation and hazard encounter simulator of claim 1, further comprising a parameter-constraining apparatus limiting at least one of said simulator movement and actuation of said at least one vehicle control.

17. The vehicle operation and hazard encounter simulator of claim 1, wherein said scene display includes at least one of a mirror, a flat opaque viewing screen, a curved opaque viewing screen, an electronic monitor display, and a partially transparent half-silvered mirror.

18. A method for simulating hazard encounter in operation of a vehicle moving in a natural environment comprising:
   (a) generating an environment view, wherein at least a part of said environment view comprises a virtual image not existing in the natural environment but visually superposed on an operator's display of the natural environment so as to appear fixed or moving in a controlled fashion in said environment view;
   (b) presenting the environment view to an operator carried by said vehicle, said vehicle operating in the natural environment;
   (c) the operator actuating controls for said vehicle, movement of said vehicle responding to actuated controls;
   (d) altering said environment view in response to at least one of vehicle movement, actuated controls, operator head movement, and operator movement within said vehicle.

19. The vehicle method of claim 18, further comprising an instrument attached to and measuring a position change of said vehicle relative to said natural environment in at most six degrees of freedom by sensing at least one of acceleration, velocity, and position, wherein output of said instrument proportionately repositions said virtual image on the operator's display of the natural environment in an opposite direction to said position change of said vehicle.

20. The method of claim 18 wherein elements presented in said environment view differ in a controlled fashion from an environment view commensurate with actual behavior of said vehicle.

* * * * *